United States Patent
Kim et al.

(10) Patent No.: US 9,927,224 B2
(45) Date of Patent: Mar. 27, 2018

(54) THICKNESS MEASURING APPARATUS AND THICKNESS MEASURING METHOD

(71) Applicant: Korea Research Institute of Standards and Science, Daejeon (KR)

(72) Inventors: Jong-Ahn Kim, Daejeon (KR); Jae-Wan Kim, Daejeon (KR); Jae-Yong Lee, Chungcheongbuk-do (KR); Jae-Heun Woo, Daejeon (KR)

(73) Assignee: Korea Research Institute of Standards and Science, Daejeon (KR)

( * ) Notice: Subject to any disclaimer, the term of this patent is extended or adjusted under 35 U.S.C. 154(b) by 120 days.

(21) Appl. No.: 14/988,332

(22) Filed: Jan. 5, 2016

(65) Prior Publication Data

US 2016/0202038 A1    Jul. 14, 2016

(30) Foreign Application Priority Data

Jan. 12, 2015    (KR) .................... 10-2015-0004240

(51) Int. Cl.
  *G01B 11/02* (2006.01)
  *G01B 11/06* (2006.01)
  (Continued)

(52) U.S. Cl.
  CPC .......... *G01B 11/06* (2013.01); *G01B 9/02041* (2013.01); *G01B 11/0675* (2013.01);
  (Continued)

(58) Field of Classification Search
  CPC ................ G01B 11/06; G01B 11/0675; G01B 9/02041; G01B 9/02048; G01B 9/02021; G01B 9/02083
  (Continued)

(56) References Cited

U.S. PATENT DOCUMENTS

| 4,815,856 A * | 3/1989 | Bruce | ................ G01B 11/0675 356/504 |
| 6,545,763 B1 * | 4/2003 | Kim | .................. G01B 11/0675 356/497 |

(Continued)

FOREIGN PATENT DOCUMENTS

KR    10-0988454 B1    10/2010

*Primary Examiner* — Tarifur Chowdhury
*Assistant Examiner* — Jonathon Cook
(74) *Attorney, Agent, or Firm* — Jenkins, Wilson, Taylor & Hunt, P.A.

(57) ABSTRACT

A thickness measuring apparatus and a thickness measuring method. The thickness measuring apparatus includes a light source outputting an extended monochromatic light with coherence; a collimating lens converting output light of the light source into incident beam of parallel ray; a beam splitter reflecting and providing the incident beam to a measurement target and transmitting first reflection light reflected on a top surface of the measurement target and second reflection light reflected on a bottom surface of the measurement target; an imaging lens disposed between the measurement target and the beam splitter with a predetermined focal distance to receive and provide the incident beam to a measurement position of the measurement target disposed on the focal distance; a camera photographing an interference fringe formed by the first and second reflection lights and outputting an interference fringe image; and a processing part.

12 Claims, 11 Drawing Sheets

(51) Int. Cl.
   *G01B 9/02*      (2006.01)
   *H04N 5/225*     (2006.01)
   *H04N 7/18*      (2006.01)

(52) U.S. Cl.
   CPC ......... *H04N 5/2254* (2013.01); *H04N 5/2256* (2013.01); *H04N 7/18* (2013.01)

(58) Field of Classification Search
   USPC ........................................................ 356/503
   See application file for complete search history.

(56) References Cited

U.S. PATENT DOCUMENTS 6,580,515 B1 *   6/2003   Li ........................ G01B 11/303
                                                            356/516
   7,649,634 B2    1/2010   Wan
   8,279,447 B2   10/2012   Pahk et al.
   2014/0333936 A1   11/2014   Chang et al.

* cited by examiner

THICKNESS MEASURING APPARATUS AND THICKNESS MEASURING METHOD

CROSS-REFERENCE TO RELATED APPLICATIONS

This U.S. non-provisional patent application claims priority under 35 U.S.C. § 119 to Korea Patent Application No. 10-2015-0004240 filed on Jan. 12, 2015, the entirety of which is incorporated by reference herein.

TECHNICAL FIELD

The present disclosure relates to thickness measuring apparatuses for measuring thickness using Haidinger interference fringe formed at a point and, more particularly, to optical thickness measuring apparatuses capable of directly measuring thickness of a desired point without depending on a result measured at another point.

BACKGROUND

A flat panel display (FPD) such as liquid crystal display (LCD) or organic light-emitting diode (OLED) is manufactured by coating a thin film transistor (TFT) or various types of transparent multi-thin films on a transparent substrate. A transparent substrate such as a flat glass substrate or a transparent film is used as a basic plate of a flat display. Accordingly, since a thickness variation of the transparent substrate needs to be measured accurately, thickness of the transparent substrate needs to be monitored with high accuracy. Moreover, since a transparent substrate whose thickness needs to be measured is increasing in size, it is becoming difficult to measure the thickness of the transparent substrate.

Thickness measuring methods of a transparent substrate are classified into contact type and noncontact type. However, contact-type measuring methods are limited in measurement speed. Therefore, optical thickness measuring methods that are noncontact-type measuring methods are widely used for in-line measurement on the process of production.

A thickness measurement interferometer is a representative thickness measuring apparatus. The thickness measurement interferometer may analyze an interference signal generated by two beams respectively reflected from a front surface and a back surface of a transparent substrate to measure glass thickness. Since the thickness measurement interferometer uses interference of laser, the thickness measurement interferometer may provide high accuracy and high resolution. However, due to $2\pi$ ambiguity that a phase of the interference signal has, the thickness measurement interferometer may be applied only to a case where thickness variation is small. The thickness measurement interferometer may provide an accurate thickness value only when the phase of the interference signal is measured at a much smaller interval than a spatial frequency of thickness variation and phase unwrapping is performed. Thus, the thickness measurement interferometer may not set a thickness measurement interval without limitation. In addition, the thickness measurement interferometer cannot measure thickness of a film when the film is coated only on some regions of the transparent substrate.

SUMMARY

Embodiments of the present disclosure provide an optical thickness measuring apparatus capable of measuring thickness of a desired point without depending on a result measured at another point.

Embodiments of the present disclosure provide an optical thickness measuring apparatus capable of measuring thickness of a desired point even when a step difference is formed on a transparent substrate by coating or the like.

A thickness measuring apparatus according to example embodiments of the present disclosure includes a light source outputting an extended monochromatic light with coherence; a collimating lens converting output light of the light source into incident beam of parallel ray; a beam splitter reflecting and providing the incident beam to a measurement target and transmitting first reflection light reflected on a top surface of the measurement target and second reflection light reflected on a bottom surface of the measurement target; an imaging lens disposed between the measurement target and the beam splitter with a predetermined focal distance to receive and provide the incident beam to a measurement position of the measurement target disposed on the focal distance; a camera photographing an interference fringe formed by the first and second reflection lights and outputting an interference fringe image; and a processing part generating a curve-fitted phase shift curve using phases and incidence angles respectively corresponding to a plurality of valleys and a plurality of peaks and calculating thickness of the measurement target using the phase shift curve.

In example embodiments, the light source may include: a laser diode oscillating at a predetermined wavelength; a speckle reducer receiving output light of the laser diode to suppress a speckle; and a multi-mode optical fiber transferring light passing through the speckle reducer.

In example embodiments, the thickness measuring apparatus may further include: a relay optical part disposed between the beam splitter and the camera to adjust a magnification of the interference fringe.

In example embodiments, the thickness measuring apparatus may further include: a moving stage moving the measurement target.

In example embodiments, the imaging lens may be a cylindrical lens.

In example embodiments, the processing part may include: an image grabber storing the interference fringe image; a coarse thickness calculator receiving the stored interference fringe image to calculate coarse thickness information between the top surface and the bottom surface of the measurement target using information of two points among peaks and valleys in the interference fringe image; a phase shift curve generator generating a curve-fitted phase shift curve using phases and incidence angles respectively corresponding to a plurality of peaks and a plurality of valleys in the interference fringe image and extracting a center phase corresponding to a center point of the interference fringe using the curve-fitted phase shift curve; an interference signal order extractor extracting an interference signal order of the center point of the interference fringe image using the coarse thickness information or improved thickness information and the center phase information; and a fine thickness calculator calculating fine thickness information between the top surface and the bottom surface of the measurement target using the interference signal order of the center point of the interference fringe image and the center phase corresponding to the center point of the interference fringe.

A thickness measuring method according to example embodiments of the present disclosure includes: providing extended monochromatic light with coherence in the form of parallel light; receiving the parallel light using an imaging lens and illuminating the received parallel light to a measurement position of a measurement target disposed in a focal point of the imaging lens according to an incidence angle; forming an interference fringe using first reflection light and second reflection light respectively reflected on a top surface and a bottom surface of the measurement target disposed in the focal point of the imaging lens; photographing the interference fringe to form an interference fringe image; forming a curve-fitted phase shift curve using phases and incidence angles respectively corresponding to a plurality of peaks and a plurality of valleys in the interference image; and calculating thickness of the measurement target using the phase shift curve.

In example embodiments, calculating the thickness of the measurement target using the phase shift curve may include: calculating coarse thickness information between the top surface and the bottom surface of the measurement target using information of two points among the peaks and the valleys in the interference fringe image; extracting a center phase corresponding to a center point of the interference fringe using the curve-fitted phase shift curve; extracting an interference signal order of the center point of the interference fringe image using the coarse thickness and information of the center phase; and calculating fine thickness between the top surface and the bottom surface of the measurement target using the interference signal order of the center point of the interference fringe image and the center phase corresponding to the center point of the interference fringe.

In example embodiments, calculating the thickness of the measurement target using the phase shift curve may include: extracting a correction phase corresponding to a specific position of the interference fringe using the curve-fitted phase shift curve; and calculating improved thickness information between the top surface and the bottom surface of the measurement target using the information of the two points among the peaks and the valleys in the interference fringe image.

In example embodiments, the thickness measuring method may further include: providing the parallel light to the imaging lens through a beam splitter.

In example embodiments, forming the interference fringe using the imaging lens further include: transferring the first reflection light and the second reflection light passing through the imaging lens and the beam splitter to a relay optical part having a predetermined magnification.

In example embodiments, the imaging lens may be a cylindrical lens, and thickness of the measurement target may be calculated at each position depending on an extending direction of the cylindrical lens.

A thickness measuring apparatus according to example embodiments of the present disclosure includes: an interferometer forming an interference fringe concerning a measurement point of a measurement target using extended monochromatic light having coherence; a camera photographing the interference fringe to output an interference fringe image; and a processing part generating a curve-fitted phase shift curve using phases and incidence angles respectively corresponding to a plurality of peaks and a plurality of valleys in the interference fringe image and calculating thickness of the measurement target using the phase shift curve. The processing part may include: an image grabber storing the interference fringe image; a coarse thickness calculator receiving the stored interference fringe image to calculate coarse thickness information between the top surface and the bottom surface of the measurement target using information of two points among peaks and valleys in the interference fringe image; a phase shift curve generator generating a curve-fitted phase shift curve using phases and incidence angles respectively corresponding to a plurality of peaks and a plurality of valleys in the interference fringe image and extracting a center phase corresponding to a center point of the interference fringe using the curve-fitted phase shift curve; an interference signal order extractor extracting an interference signal order of the center point of the interference fringe image using the coarse thickness information or improved thickness information and the center phase; and a fine thickness calculator calculating fine thickness between the top surface and the bottom surface of the measurement target using the interference signal order of the center point of the interference fringe image and the center phase corresponding to the center point of the interference fringe.

A thickness measuring method according to example embodiments of the present disclosure includes: forming an interference fringe concerning a measurement point of a measurement target using extended monochromatic light having coherence; photographing the interference fringe to form an interference fringe image; generating a curve-fitted phase shift curve using phases and incidence angles respectively corresponding to a plurality of peaks and a plurality of valleys in the interference fringe image; calculating coarse thickness information between a top surface and a bottom surface of the measurement target using information of two points among peaks and valleys in the interference fringe image; extracting a center phase corresponding to a center point of the interference fringe using the curve-fitted phase change curve; extracting an interference signal order of the center point of the interference fringe image using the coarse thickness information and the center phase information; and calculating coarse thickness between the top surface and the bottom surface of the measurement target using the interference signal order of the center point of the interference fringe image and the center phase corresponding to the center point of the interference fringe.

BRIEF DESCRIPTION OF THE DRAWINGS

The present disclosure will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the present disclosure.

DETAILED DESCRIPTION

According to example embodiments of the present disclosure, a novel thickness measuring method using a circular interference fringe is proposed to overcome disadvantages of a conventional thickness measurement interferometer. A study for measuring thickness or a refractive index of a transparent flat plate using a circular interference fringe has been conducted even in the past. However, in a conventional method, the step of calculating a thickness value from an interference fringe is not efficiently performed. Therefore, the conventional method cannot provide high accuracy and repeatability. According to example embodiments of the present disclosure, a phase analysis method using characteristics of a circular interference fringe was newly proposed and validity and performance were evaluated through a test.

Figure 1:
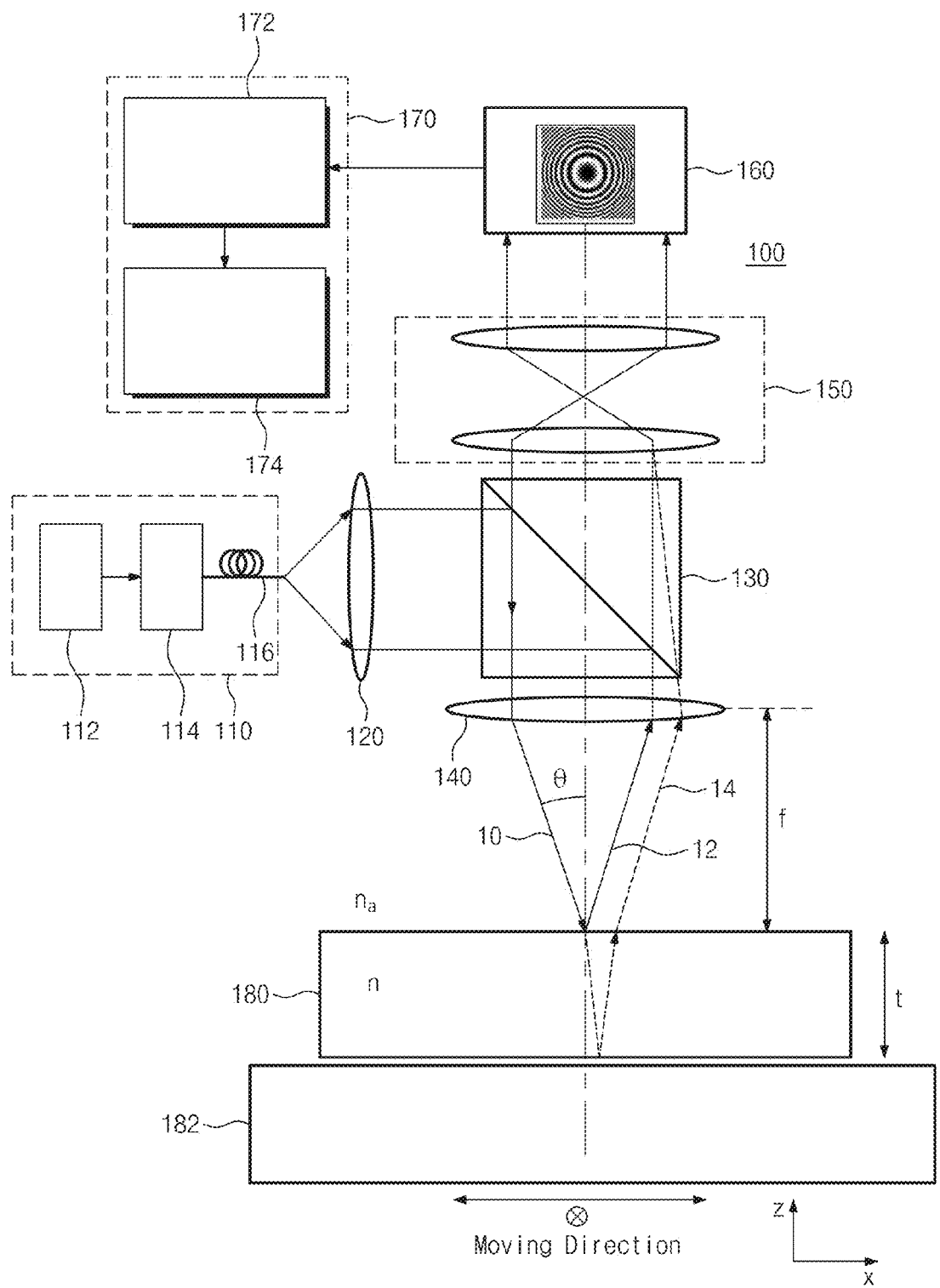
FIG. 1 is a conceptual diagram illustrating a thickness measurement interferometer according to example embodiments of the present disclosure.

FIG. 1 is a conceptual diagram illustrating a thickness measurement interferometer according to example embodiments of the present disclosure.

Figure 2:
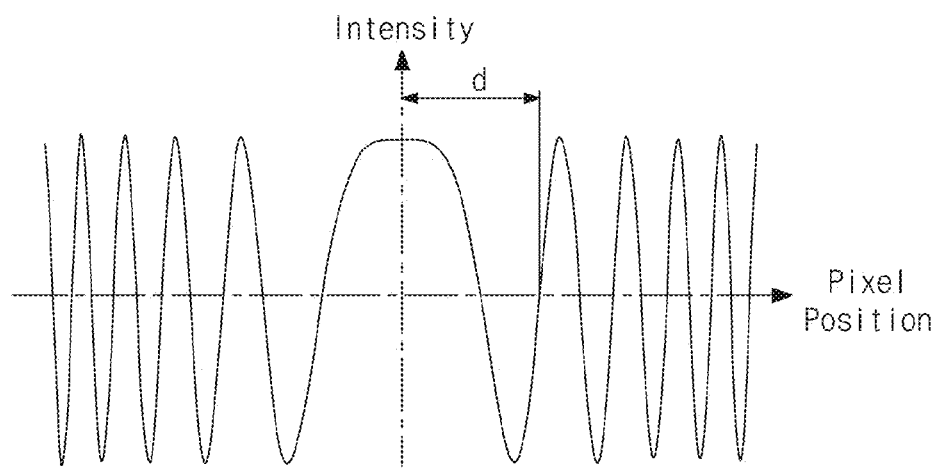
FIG. 2 illustrates a spatial distribution of an interference fringe of the thickness measurement interferometer in FIG. 1.

FIG. 2 illustrates a spatial distribution of an interference fringe of the thickness measurement interferometer in FIG. 1.

Figure 3:
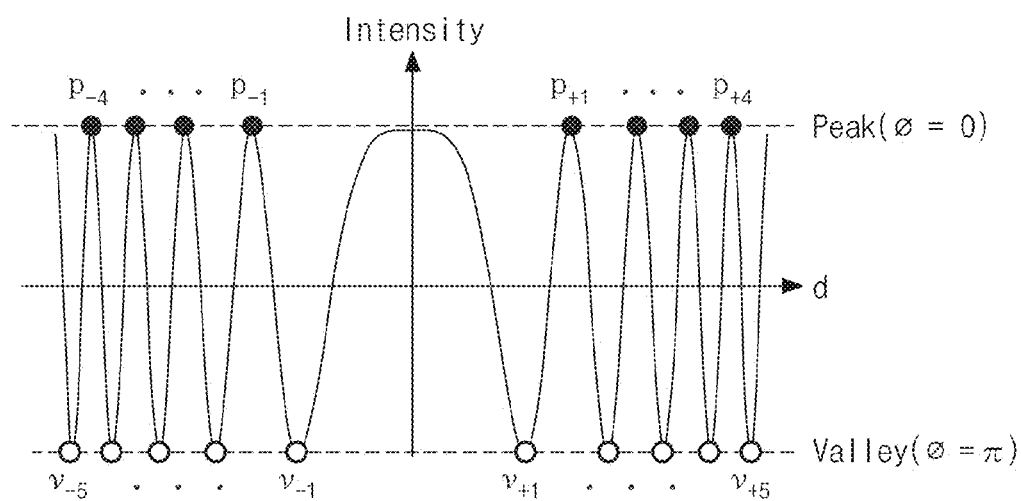
FIG. 3 illustrates peaks and valleys of the interference fringe in FIG. 2.

FIG. 3 illustrates peaks and valleys of the interference fringe in FIG. 2.

Figure 4:
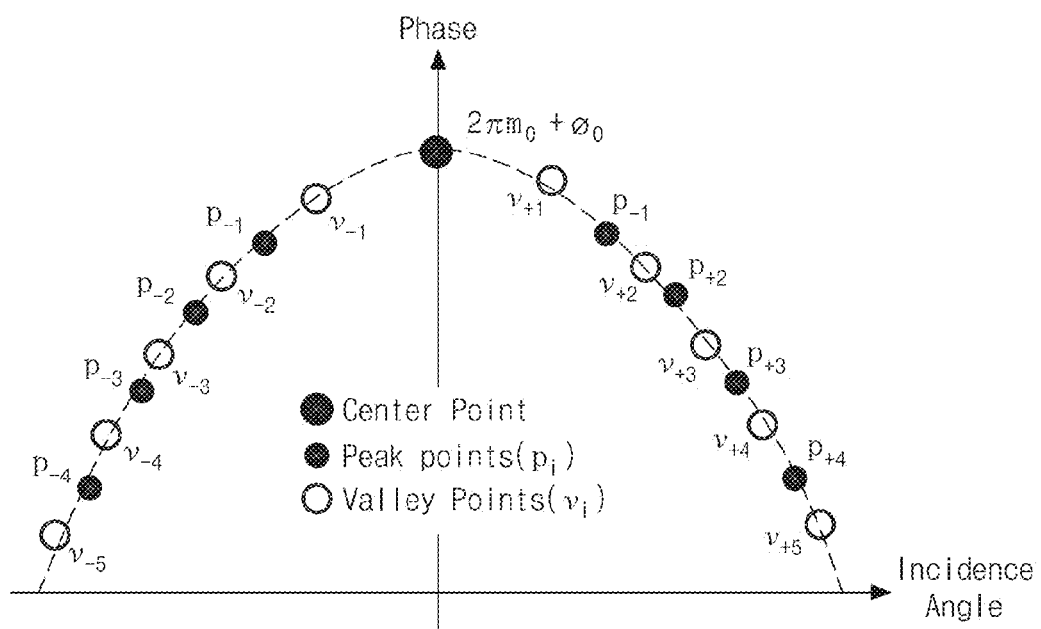
FIG. 4 illustrates a phase shift curve where the interference fringe in FIG. 3 is mapped to a phase depending on an incidence angle.

FIG. 4 illustrates a phase shift curve where the interference fringe in FIG. 3 is mapped to a phase depending on an incidence angle.

Figure 5:
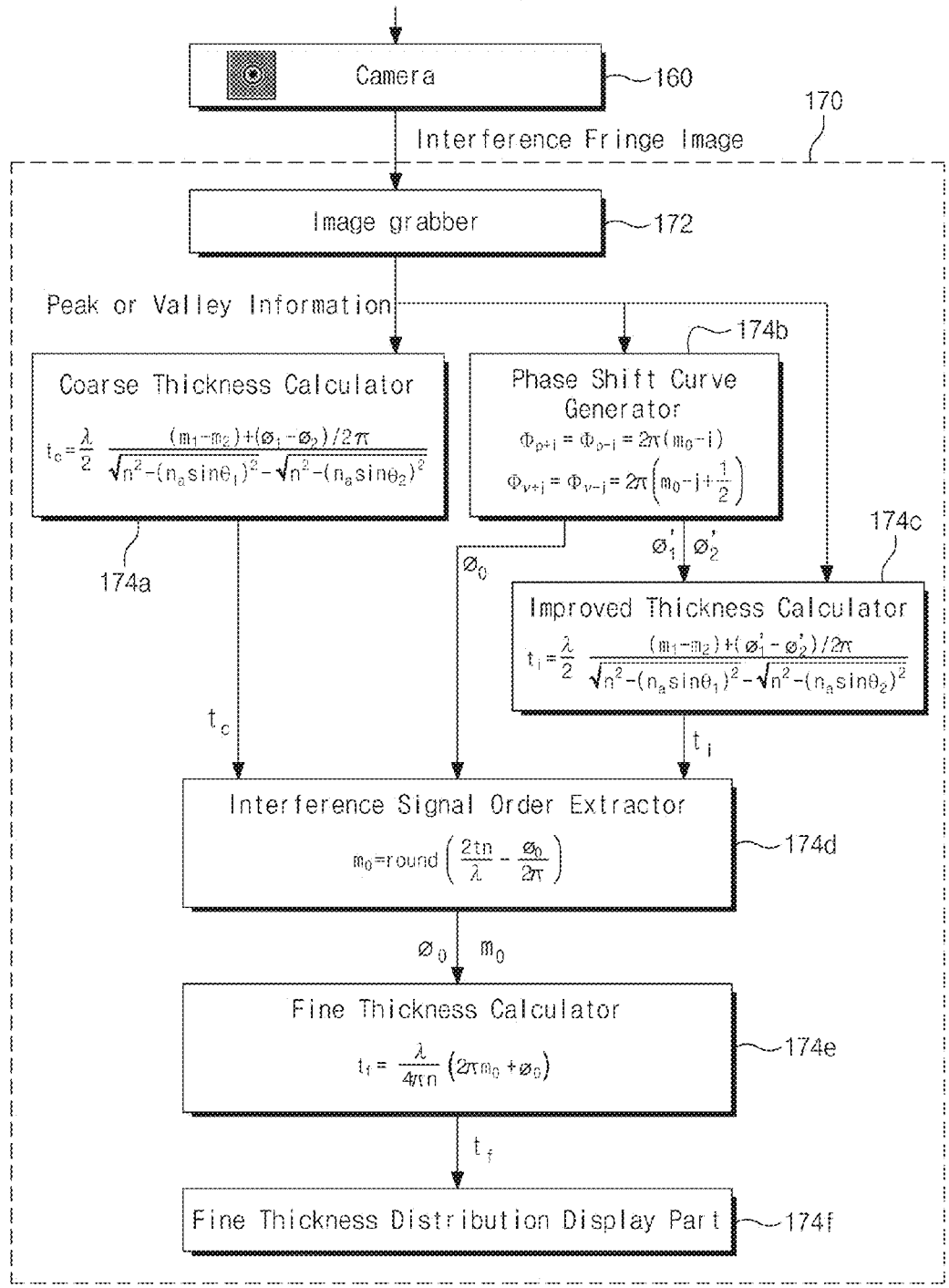
FIG. 5 is a block diagram of a processing part for calculating thickness from the interference fringe in FIG. 1.

FIG. 5 is a block diagram of a processing part for calculating thickness from the interference fringe in FIG. 1.

Figure 6:
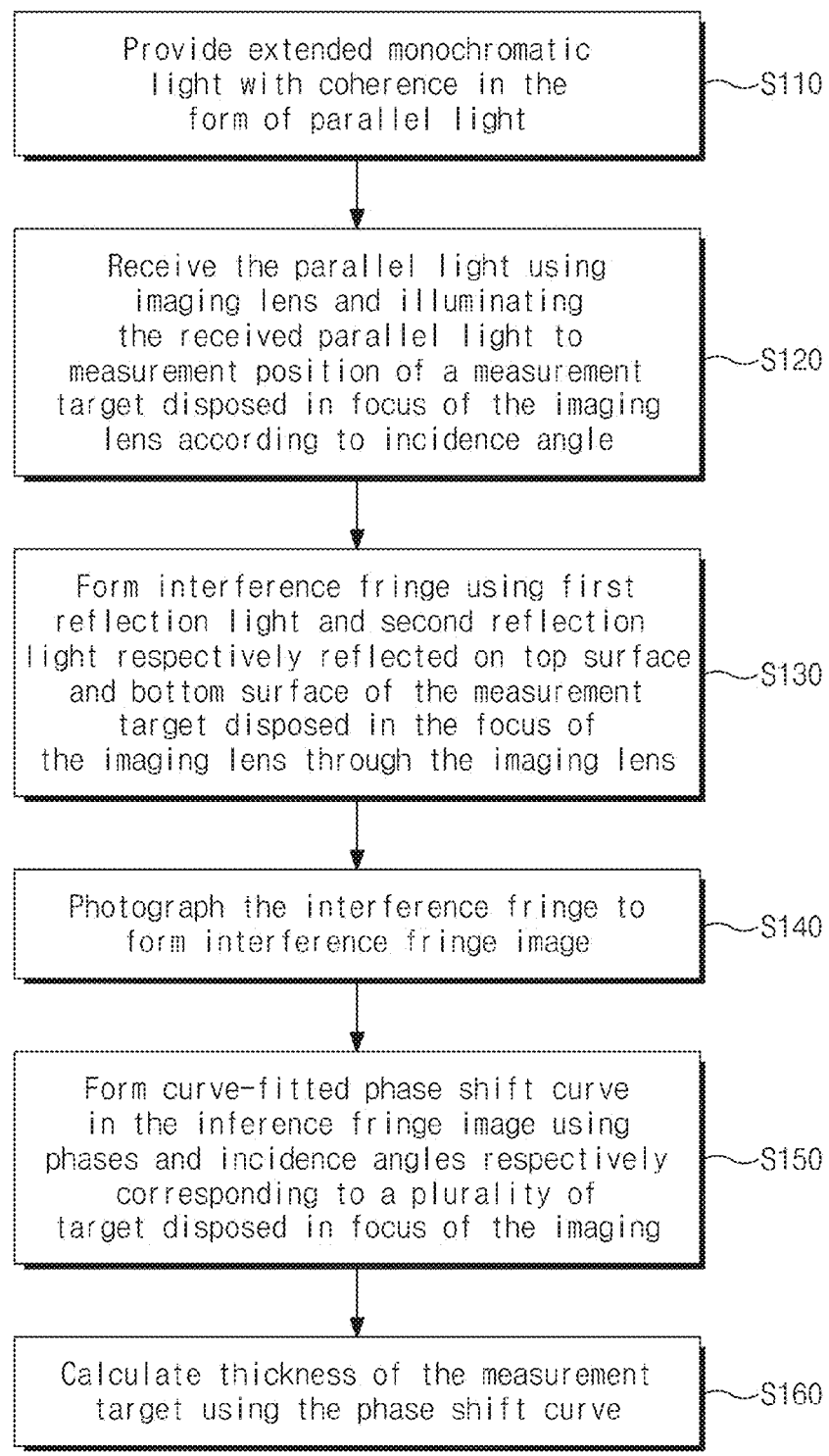
FIG. 6 is a flowchart summarizing a thickness measuring method according to example embodiments of the present disclosure.

FIG. 6 is a flowchart summarizing a thickness measuring method according to example embodiments of the present disclosure.

Referring to FIGS. 1 to 6, a thickness measuring apparatus 100 includes a light source 110 outputting an extended monochromatic light with coherence, a collimating lens 120 converting output light of the light source into incident beam of parallel ray, a beam splitter 130 reflecting and providing the incident beam 10 to a measurement target 180 and transmitting first reflection light 12 reflected on a top surface of the measurement target 180 and second reflection light 14 reflected on a bottom surface of the measurement target 180, an imaging lens 140 disposed between the measurement target 180 and the beam splitter 130 with a predetermined focal distance to receive and provide the incident beam 10 to a measurement position of the measurement target 180 disposed on the focal distance, a camera 160 photographing an interference fringe formed by the first and second reflection lights 12 and 14 transmitting the imaging lens 140 to output an interference fringe image, and a processing part 170. The processing part 170 generates a curve-fitted phase shift curve using phases and incidence angles respectively corresponding to a plurality of valleys and a plurality of peaks and calculates thickness of the measurement target 180 using the phase shift curve.

A thickness measuring method according to example embodiments of the present disclosure includes providing extended monochromatic light with coherence in the form of parallel light (S110), receiving the parallel light using an imaging lens and illuminating the received parallel light to a measurement position of a measurement target disposed in a focus of the imaging lens according to an incidence angle (S120), forming an interference fringe using first reflection light reflected on and second reflection light respectively reflected on a top surface and a bottom surface of the measurement target disposed in the focal point of the imaging lens through the imaging lens (S130), photographing the interference fringe to form an interference fringe image (S140), forming a curve-fitted phase shift curve in the interference fringe image using phases and incidence angles respectively corresponding to a plurality of peaks and a plurality of valleys (S150), and calculating thickness of the measurement target using the phase shift curve (S160).

Calculating the thickness of the measurement target using the phase shift curve (S160) may include calculating coarse thickness information between the top surface and the bottom surface of the measurement target using information of two points among the peaks and the valleys in the interference fringe image, extracting a center phase corresponding to a center point of the interference fringe using the curve-fitted phase shift curve, extracting an interference signal order of the center point of the interference fringe image using the coarse thickness information and the center phase information, and calculating fine thickness information between the top surface and the bottom surface of the measurement target using the interference signal order of the center point of the interference fringe image and the center phase corresponding to the center point of the interference fringe.

Calculating the thickness of the measurement target using the phase shift curve may include extracting a correction phase corresponding to a specific position of the interference fringe using the curve-fitted phase shift curve and calculating improved thickness information between the top surface and the bottom surface of the measurement target using the information of the two points among the peaks and the valleys in the interference fringe image.

The measurement target 180 may be a transparent substrate or a transparent material. For example, the measurement target 180 may be a glass substrate, a plastic substrate, a transparent film or a semiconductor substrate. The measurement target 180 may be a material that a wavelength of the light source 110 may transmit. For example, when the measurement target 180 is a silicon substrate, the wavelength of the light source 110 may be an infrared area.

The light source 110 may provide extended monochromatic light with coherence. Output light of the light source 110 may impinge parallel to the imaging lens 140. On a plane intersecting the output light of the light source, respective points may be incoherent with respect to each other and have coherence depending on time. For example, the light source 110 may include a laser diode 112 oscillating at predetermined wavelength, a speckle reducer 114 receiving output light of the laser diode 112 to suppress a speckle, and a multi-mode optical fiber 116 transmitting light passing through the speckle reducer 114.

A center wavelength of the laser diode 112 may be 852 nm. The multi-mode optical fiber 116 may be used at the back end of the laser diode 112 to make a form similar to that of the extended monochromatic light source using the laser diode 112. The speckle reducer 114 may be disposed between the laser diode 112 and the multi-mode optical fiber to reduce a speckle generated when output monochromatic light of the laser diode 112 passes through the multi-mode optical fiber 116.

The monochromatic light output from the multi-mode optical fiber 116 is converted into parallel light at the collimating lens 120. A beam size of the parallel light may be between several millimeters and several centimeters.

The parallel light passing through the collimating lens 120 is provided to the beam splitter 130 to be reflected. The reflected parallel light impinges parallel to the imaging lens 140. The beam splitter 130 may reflect incident beam 10 impinging parallel to the imaging lens 140 and provide the reflected incident beam 10 to the imaging lens 140 and the measurement target 180. In addition, the beam splitter 130 may transmit reflection light reflected at the measurement target 180.

The imaging lens 140 may be a circular convex lens. The focal distance of the imaging lens 140 may be several tens millimeters. Preferably, the focal distance of the imaging lens 140 may be about 30 mm.

The incident beam passing through the imaging lens 140 may be collected to a focal point of the imaging lens 140. The focal point of the imaging lens 140 may be set to a measurement position of the measurement target 180. An incidence angle θ of the incident beam is expressed as an angle between a direction of the incident beam and a center axis of the imaging lens 140.

After first reflection light 12 reflected on a front surface of the measurement target 180 and second reflection light 14 reflected on a back surface of the measurement target 180 pass through the imaging lens 140 and the beam splitter 130, they may generate an interference fringe on a focal plane of the imaging lens 140. The interference fringe may be a Haidinger interference fringe.

The interference fringe may be converted into a magnified image magnified by a relay optical part 150. The magnification of the relay optical part 150 may be about 0.3 times. The relay optical part 150 may include a pair of convex lenses having a confocal structure.

The interference fringe may be photographed at the back end of the relay optical part 150 by the camera 160. The relay optical part 150 may transfer the interference image to a photographing plane of the camera 160. The camera 160 may include a one-dimensional or two-dimensional optical sensor array. Preferably, the camera 160 may be a two-dimensional optical sensor array. The camera may include a CCD sensor or a CMOS sensor.

A moving stage 182 may move the measurement target 180 to change a measurement position. The measurement position may correspond to a focal point of the imaging lens 140.

A conventional thickness measuring apparatus divides a space between a center point and an edge position of a measurement target into fine sections to measure thicknesses at the center point and the edge position of the measurement target and measures thicknesses in all sections to eliminate 2π ambiguity.

However, according to example embodiments of the present disclosure, thickness measurement at two positions spaced apart from each other may be sufficiently performed by measuring thickness only at a desired measurement position.

Accordingly, the moving stage 182 may be a stage that is capable of transferring a large-area substrate. To measure a thickness distribution in a fine area, the moving stage 182 may be stage that is capable of adjusting a fine position using a piezoelectric element or the like.

Hereinafter, the operation principle of the present disclosure will now be described below in detail.

When coherent light such as laser impinges on the measurement target 180 such as a transparent flat plate, two beams respectively reflected on the front and back surfaces of the measurement target 180 generate an interference signal due to multiple internal reflection.

When extended monochromatic light impinges on the measurement target 180, incident beam having an incidence angle θ is reflected on the front and back surfaces of the measurement target 180 to generate the first reflection light 12 and the second reflection light 14, respectively. The first reflection light 12 and the second reflection light travel parallel to each other. An optical path difference (OPD) between the first reflection light 12 and the second reflection light 14 is given as follows:

$$\text{OPD} = 2t\sqrt{n^2 - (n_a \sin\theta)^2} \qquad \text{Equation (1)}$$

In the Equation (1), t presents thickness of the measurement target 180, n represents a refractive index of the measurement target 180, and $n_a$ represents a refractive index of air. Monochromatic incident beams collected through the imaging lens 140 having a focal length (f) impinge on the measurement position of the measurement target 180 (the focal point of the imaging lens 140) with different incidence angles θ. Accordingly, the thickness of the measurement target 180 is calculated in the focus of the imaging lens 140. In addition, the measurement target may be moved to measure a spatial thickness distribution.

The first reflection light 12 and the second reflection light 14 respectively generated by reflecting the incident beam on the front surface and the back surface of the measurement target 180 generate an interference signal or an interference fringe on the focal plane of the imaging lens 140. Beams having different incidence angles θ have different optical path differences. Thus, a circular interference fringe is generated on a screen disposed on the focal surface of the imaging lens 140 by interference of the reflection lights 12 and 14. A distance d from the center of interference fringe (or the central axis of the imaging lens 140) to an arbitrary point and the incidence angle θ have a relational expression, as follows:

$$d = f \cdot \tan(\theta) \qquad \text{Equation (2)}$$

A phase of the interference signal generated by interference of reflected lights having the optical path difference (OPD) is given as follows:

$$OPD = \lambda\left(m - \frac{1}{2} + \frac{\phi}{2\pi}\right) \qquad \text{Equation (3)}$$

In the Equation (3), λ represents vacuum wavelength of a light source used, m represents an order of an interference signal, and f represents a phase of the interference signal. Since the refractive index (n) of the measurement target 180 is greater than the refractive index ($n_a$) of the air (n>$n_a$), the reflected light reflected on a top surface of the measurement target 180 is subjected to additional phase shift by π.

If the Equations (1) and (3) are simultaneously solved, the measured interference fringe may be analyzed to calculate coarse thickness $t_c$ of the transparent flat plate. However, due to the 2π ambiguity, only a phase value within the range of ±π is obtained and the order of the interference signal cannot be known. Accordingly, the coarse thickness $t_c$ may be calculated using the optical path difference (OPD) obtained with respect to the different incidence angles θ. If the Equations (1) and (3) are simultaneously solved with respect to two different incidence angles $θ_1$ and $θ_2$, Equations (4) and (5) may be given as follows:

$$2t\sqrt{n^2 - (n_a \sin θ_1)^2} = \lambda\left(m_1 - \frac{1}{2} + \frac{\phi_1}{2\pi}\right) \quad \text{Equation (4)}$$

$$2t\sqrt{n^2 - (n_a \sin θ_2)^2} = \lambda\left(m_2 - \frac{1}{2} + \frac{\phi_2}{2\pi}\right) \quad \text{Equation (5)}$$

In the Equations (4) and (5), $m_1$ represents an order of the interference signal at the first incidence angle $θ_1$, $φ_1$ represents a phase of the interference signal at the first incidence angle $θ_1$, $m_2$ represents an order of the interference signal at the second incidence angle $θ_2$, and $φ_2$ represents a phase of the interference signal at the second incidence angle $θ_2$.

Finally, if a difference between the Equations (4) and (5) is used, an equation of the coarse thickness $t_c$ of the measurement target 180 may be given as follows:

$$t_c = \frac{\lambda}{2} \frac{(m_1 - m_2) + (\phi_1 - \phi_2)/2\pi}{\sqrt{n^2 - (n_a \sin θ_1)^2} - \sqrt{n^2 - (n_a \sin θ_2)^2}} \quad \text{Equation (6)}$$

A relative difference ($m_1 - m_2$) of an interference signal order of two different positions on a circular interference fringe may be used to calculate the coarse thickness $t_c$. Thus, the thickness may be calculated even when an absolute value of an interference signal order at each point is not known. The incidence angles $θ_1$ and $θ_2$ and phases $φ_1$ and $φ_2$ respectively corresponding to the two different positions $d_1$ and $d_2$ on the interference fringe are required to calculate the thickness using the Equation (6). When the two different positions $d_1$ and $d_2$ are selected as a peak point of the interference fringe, a phase corresponding to the peak point is zero radian. On the other hand, when the two different positions $d_1$ and $d_2$ are selected as a valley point of the interference fringe, a phase corresponding to the valley point may be π radian.

Referring to FIGS. 2 and 3, peak points ($p_{-i}$, $p_{+i}$) or valley points ($v_{-j}$, $v_{+j}$) of the interference fringe have the same phase value (0 or π), respectively (i being an order number of the peak and j being an order number of the valley). Specifically, each peak of the interference fringe has a phase value of zero radian and each peak of the interference fringe has a phase value of π radian. Accordingly, when a position of a peak or a valley having a known phase is selected, the coarse thickness $t_c$ may be easily calculated. The relative difference ($m_1 - m_2$) of the interference signal between a selected pair of positions may be obtained by counting the number of peaks and valley on the interference fringe. A distance from the center of the interference fringe to an arbitrary point is denoted as d. On the other hand, the peak point is sequentially expressed as $p_{+1}$ and $p_{+2}$ as traveling from the center of the interference fringe to the right side. The valley point is sequentially expressed as $v_{+1}$ and $v_{+2}$ as traveling from the center of the interference fringe to the right side.

If the Equation (2) is used, the incidence angles $θ_1$ and $θ_2$ corresponding to the peak point or the valley point used to calculate the coarse thickness $t_c$ may be calculated, respectively. If the calculation method is used, the coarse thickness $t_c$ may be calculated even with the small amount of calculation. However, only two peak or valley points are used. Therefore, the method may reduce repeatability of a thickness measurement value and cause a systematic error when alignment of an optical system is not complete.

Referring to FIG. 4, a novel method is proposed to overcome disadvantages such as reduction in repeatability and occurrence of the systematic error. For this, a curve-fitted phase shift curve is calculated using each peak point and each valley point on an interference fringe. Then, thickness of a transparent flat plate may be calculated using the curve-fitted phase shift curve.

Specifically, it will be assumed that an order of an interference signal is $m_0$ and a phase of the interference signal is $φ_0$ at a center point of the interference fringe. In this case, peak or valley point may not be accurately determined at the center point of the interference fringe. Therefore, phase calculation at the center point is omitted.

When a position of a first valley ($v_{-1}$, $v_{+1}$) is closer to the center point of the interference fringe, a phase value ($Φ_{pi}$, $Φ_{vj}$) of each peak or each valley except for the center point may be given as follows:

$$Φ_{p+i} = Φ_{p-i} = 2\pi(m_0 - i) \quad \text{Equation (7)}$$

$$Φ_{v+j} = Φ_{v-j} = 2\pi\left(m_0 - j + \frac{1}{2}\right)$$

In the Equation (7), i represents a turn of a peak and j represents a turn of a valley.

When a position of a first peak ($p_{-1}$, $p_{+1}$) is closer to the center point of the interference fringe, a phase value ($Φ_{pi}$, $Φ_{vj}$) of each peak or each valley except for the center point may be given as follows:

$$Φ_{p+i} = Φ_{p-i} = 2\pi(m_0 - i) \quad \text{Equation (8)}$$

$$Φ_{v+j} = Φ_{v-j} = 2\pi\left(m_0 - j - \frac{1}{2}\right)$$

In the Equation (8), a subscript p represents a peak, a subscript v represents a valley, i represents a turn of the peak, and j represents a turn of the valley.

A phase shift curve to map a phase depending on an incidence angle may be formed using incidence angle values obtained from the calculated phase values or the calculated valley point value. The phase shift curve is changed more gently than the interference fringe. Accordingly, the phase shift curve may be curve-fitted with a polynomial. Thus, a curve-fitted phase shift curve formula may be obtained. The phase shift curve formula is curve-fitted using a plurality of peak and valley values. Accordingly, if the phase shift curve formula is used, an influence of an accident error may be significantly reduced. Moreover, an interpolated phase value may be stably calculated even at an arbitrary point except for the peak or valley point.

If the phase shift curve formula obtained by curve fitting is used, fine thickness may be calculated. Referring to the Equation (6), if a difference in incidence angle between two points of an interference fringe used in thickness calculation is small, a phase measurement error is amplified to occur at a calculated thickness value. Thus, a center phase $φ_0$ at a center point of the interference fringe corresponding to a minimum incidence angle and a phase at a point corresponding to a maximum incidence angle may be used to maximize an incidence angle difference of two points used in calculation.

A corrected phase ($\varphi'_1$, $\varphi'_2$) of each point may be calculated from a curve-fitted phase shift curve formula. A point extrapolated from the phase shift curve formula may be used to increase the incidence angle difference. However, when the extrapolated point is used, a curve-fitted error may increase. Accordingly, it is preferable to use the maximum incidence angle within the measured incidence angle range. As a result, if the corrected phase ($\varphi'_1$, $\varphi'_2$) is used, improved thickness $t_i$ may be given as follows:

$$t_i = \frac{\lambda}{2} \frac{(m_1 - m_2) + (\phi'_1 - \phi'_2)/2\pi}{\sqrt{n^2 - (n_a \sin\theta_1)^2} - \sqrt{n^2 - (n_a \sin\theta_2)^2}} \quad \text{Equation (9)}$$

To reduce a systematic error that may occur due to unstable alignment of an optical system when the improved thickness $t_i$ is calculated, thickness values may be calculated with respect to incidence angles of two directions (left and right directions on the basis of the center point of the interference fringe), respectively and an average of the two values may be decided as a final thickness value.

If a thickness measuring method of a transparent flat plate using a Haidinger interference fringe is applied, $2\pi$ ambiguity limitation of a phase measurement value that an interferometer has may be overcome. However, as mentioned above, the phase measurement error may be amplified at the thickness calculation value. Thus, accuracy and repeatability of thickness according to example embodiments of the present disclosure may be reduced as compared to a thickness measuring method using an interferometer.

Another method for increasing accuracy and repeatability of thickness is proposed to overcome the foregoing disadvantages. Specifically, only an order value of an interference signal may be calculated with the thickness value calculated using the Equation (6). Then, final fine thickness $t_f$ may be calculated using the phase value $\varphi_0$ of the center point calculated from the phase shift curve. Specifically, the thickness of the measurement target and the phase of the interference signal have a relation, as follows:

$$t_f = \frac{\lambda}{4\pi n}(2\pi m_0 + \phi_0) \quad \text{Equation (10)}$$

In the Equation (10), $m_0$ represents an order of the interference signal at a center point of the interference fringe. The order of the interference signal has an integer value. Therefore, an order value of the interference signal may be expressed from the Equation (10), as follows:

$$m_0 = \text{round}\left[\frac{2t_c n}{\lambda} - \frac{\phi_0}{2\pi}\right] \quad \text{Equation (11)}$$

$$m_0 = \text{round}\left[\frac{2t_i n}{\lambda} - \frac{\phi_0}{2\pi}\right]$$

If the calculation is performed by substituting the coarse thickness value $t_c$ obtained in the Equation (6) or the improved thickness value $t_i$ obtained in the Equation (9) or the phase value $\varphi_0$ of the center point obtained in the phase shift curve into the Equation (11), the order value $m_0$ of the interference signal may be obtained.

If the calculation is performed by substituting the order value $m_0$ of the interference signal calculated in the Equation (11) and the phase value $\varphi_0$ of the center point calculated from the phase shift curve formula into the Equation (10), the fine thickness $t_f$ may be measured without $2\pi$ ambiguity. Resolution and accuracy that a typical thickness measuring interferometer has may be obtained. In addition, an interferometer according to example embodiments of the present disclosure may arbitrarily set a thickness measurement interval. In addition, an interferometer according to example embodiments of the present disclosure may measure thickness of a film even when the film is coated only on some regions of a transparent substrate.

Referring to FIG. 5, the processing part 170 may include an image grabber 172 storing the interference fringe image and a calculation processing part 174. The calculation processing part 174 includes a coarse thickness calculator 174a receiving the stored interference fringe image to calculate coarse thickness information between the top surface and the bottom surface of the measurement target 180 using information of two points among peaks and valleys in the interference fringe image, a phase shift curve generator 174b generating a curve-fitted phase shift curve using phases and incidence angles respectively corresponding to a plurality of peaks and a plurality of valleys in the interference fringe image and extracting a center phase corresponding to a center point of the interference fringe using the curve-fitted phase shift curve, an interference signal order extractor 174d extracting an interference signal order of the center point of the interference fringe image using the coarse thickness information or improved thickness information and the center phase information, and a fine thickness calculator 174e calculating fine thickness information between the top surface and the bottom surface of the measurement target 180 using the interference signal order of the center point of the interference fringe image and the center phase corresponding to the center point of the interference fringe.

The image grabber 172 may be designed with a separate component or configured with a resource in the processing part 170. When the processing part 170 is a computer, the image grabber 172 may be a separate circuit board mounted on a slot of the computer. When the computer receives an interference fringe image from the camera and stores the interference fringe image in a memory of the computer, the image grabber 172 may include the memory of the computer.

The coarse thickness calculator 174a receives intensity information depending on a position in a predetermined area from the interference fringe image. More specifically, the coarse thickness calculator 174a may extract peak information and valley information depending on a position in the interference fringe image. Then coarse thickness may be calculated using a pair of peak information and a pair of valley information among the extracted peak information and the extracted valley information. The coarse thickness may use the Equation (6).

The phase shift valley generator 174b may extract the peak information and the valley information depending on a position from the interference fringe image. The valley information and the peak information may be converted into phase information using the Equation (7) or (8). An incidence angle corresponding to each valley point may be obtained using the Equation (2), and an incidence angle corresponding to each peak point may be obtained using the Equation (2). A phase shift curve to map a phase depending on an incidence angle may be generated using the incidence angle and the phase. The phase shift curve may be curve-fitted. More specifically, the phase shift curve may be curve-fitted with a polynomial to produce a phase shift curve formula. A center point of the phase shift curve formula may provide a center phase at the center point of the interference fringe.

The improved thickness calculator 174c may calculate more improved thickness than the coarse thickness. Specifically, a phase corrected at an arbitrary position may be calculated using the phase shift curve formula. If the corrected phase and the Equation (9) similar to the Equation (5) are used, improved thickness may be calculated.

The interference signal order extractor 174d may extract an order of an interference signal at the center point of the interference fringe using the Equation (11). The coarse thickness or the improved thickness and the center phase at the center point of the interference fringe may be used to obtain the order of the interference signal.

The fine thickness extractor 174e may apply the center phase at the center point of the interference and the order of the interference signal at the center point of the interference fringe to calculate fine thickness.

The fine thickness calculated by the fine thickness calculator 174e may be calculated at each measurement position. A fine thickness distribution depending on the measurement position may be displayed by a fine thickness distribution display part 174f.

Figure 7:
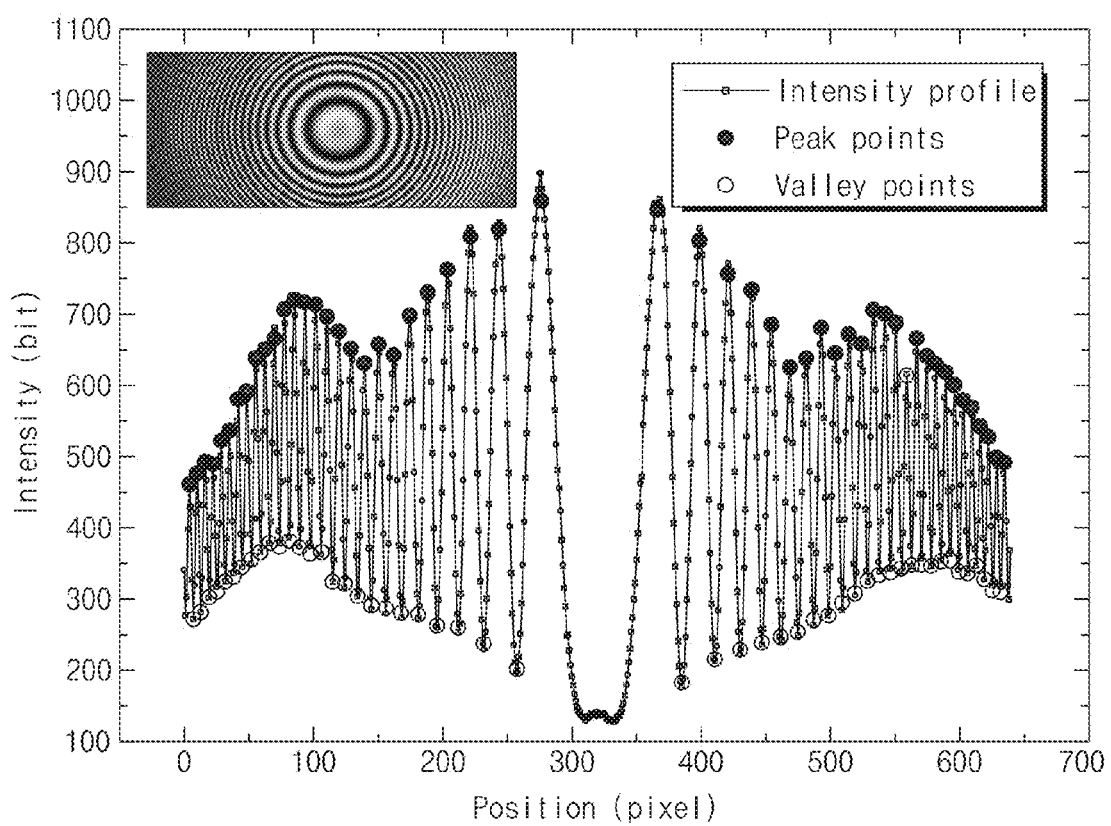
FIG. 7 illustrates an intensity distribution of an interference fringe image according to example embodiments of the present disclosure.

FIG. 7 illustrates an intensity distribution of an interference fringe image according to example embodiments of the present disclosure.

Figure 8:
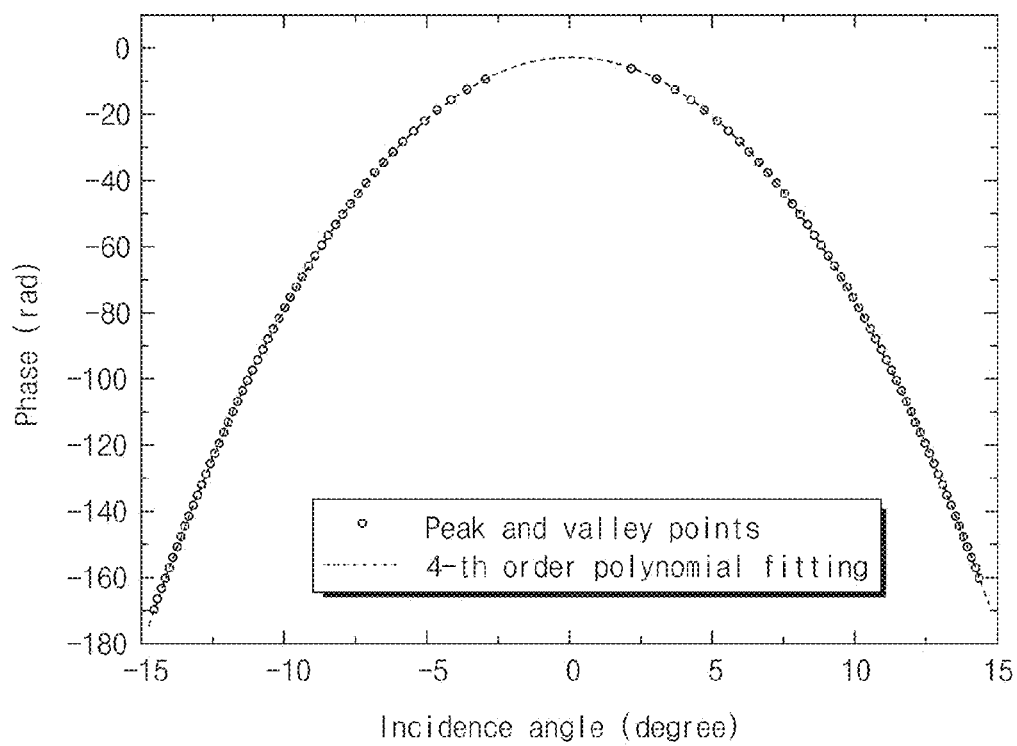
FIG. 8 illustrates a phase shift curve made using the intensity distribution of the interference fringe image in FIG. 7.

FIG. 8 illustrates a phase shift curve made using the intensity distribution of the interference fringe image in FIG. 7.

Figure 9:
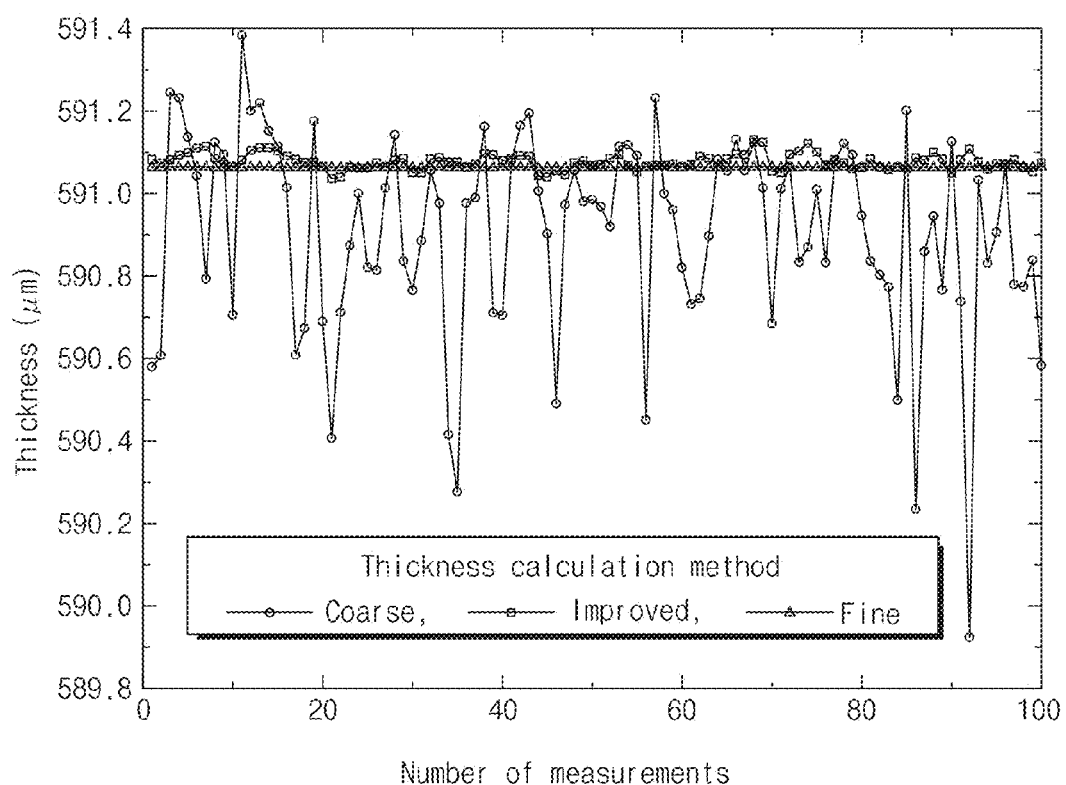
FIG. 9 illustrates coarse thickness, improved thickness, and fine thickness obtained using the interference fringe image in FIG. 7.

FIG. 9 illustrates coarse thickness, improved thickness, and fine thickness obtained using the interference fringe image in FIG. 7.

Figure 10:
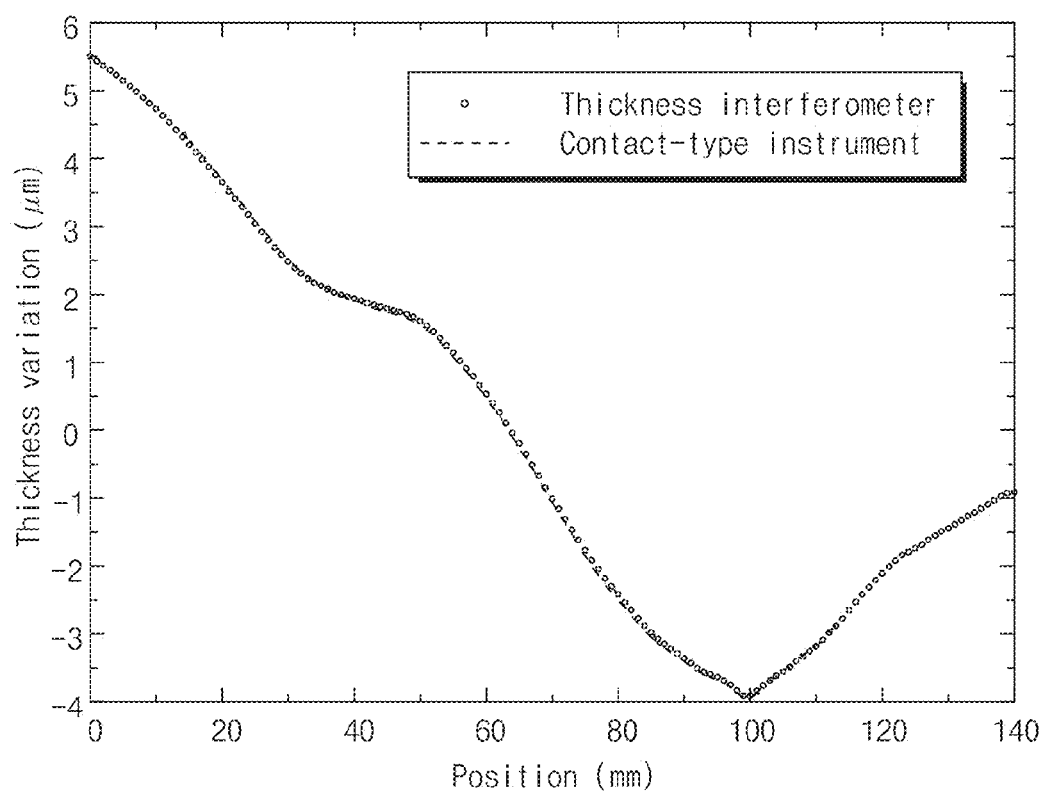
FIG. 10 illustrates fine thickness obtained using the interference fringe image in FIG. 7 and thickness obtained by a contact-type thickness measuring method.

FIG. 10 illustrates fine thickens obtained using the interference fringe image in FIG. 7 and thickness obtained by a contact-type thickness measuring method.

Referring to FIG. 7, a measurement target is a glass substrate having thickness of about 500 micrometers. A Haidinger interference fringe and an interference signal profile of a center portion are displayed to measure the thickness of the glass substrate. In such an interference signal profile, peak and valley points may be found.

Referring to FIG. 8, a point of a first peak ($p_{-1}$, $p_{+1}$) corresponds to a case where it is closer to a center point of an interference fringe, and a phase shift curve may be calculated using the Equation (6). The phase shift curve may be calculated by curve-fitting a phase and an incidence angle corresponding to each peak and valley point with a fourth-order polynomial. The fourth-order polynomial is used for curve-fitting the phase shift curve. The phase shift curve is calculated under the assumption that interference signal order of the center point is zero.

From the obtained phase shift curve, an incidence angle and a phase at a maximum phase position of the center point and a minimum phase position at the left and right ends are calculated, respectively. Improved thickness is calculated by substituting the calculated incidence angle and the calculated phase into the Equation (9). In the next step, the interference signal order is calculated by substituting the calculated improved thickness into the Equation (11). Then final fine thickness is calculated by substituting the phase and the interference signal order of the center point into the Equation (11).

During the calculation, a camera phase position value of the interference fringe must be converted into an incidence angle value. The camera phase position value may be obtained by additionally considered a magnification of a relay optical part into the Equation (2). Multiplication of a focal length of an imaging lens and the magnification of the relay optical part, which are conversion factors of a position and an incidence angle, may be accurately obtained.

Referring to FIG. 9, a result obtained by repeatedly measuring thickness of a glass substrate for a flat panel display is displayed. A result of a conventional coarse thickness measuring method using only two peak points and results an improved thickness measuring method and a fine thickness measuring method according to example embodiments of the present disclosure were compared. A standard deviation of a thickness value measured 100 times is about 245.2 nanometers (coarse thickness measurement), about 19.2 nanometers (improved thickness measurement), and about 0.2 nanometer (fine thickness measurement). Measurement repeatability of the improved thickness was improved as compared to the method using only two peak points. When the fine thickness is calculated by separating the interference signal order and the phase of the center point from the phase shift curve, higher thickness measurement repeatability may be obtained.

Referring to FIG. 10, a thickness variation profile of a glass substrate having thickness of 700 micrometers was measured using a fine thickness measuring method and a contact-type thickness measuring method, respectively and measurement results were compared.

A fine thickness measurement test apparatus according to example embodiments of the present disclosure measured thickness at intervals of 1 millimeter, and a contact-type thickness measuring apparatus measured thickness at intervals of 0.1 millimeter. From a comparison result, it can be seen that thickness measuring values of the apparatuses match each other well.

Figure 11:
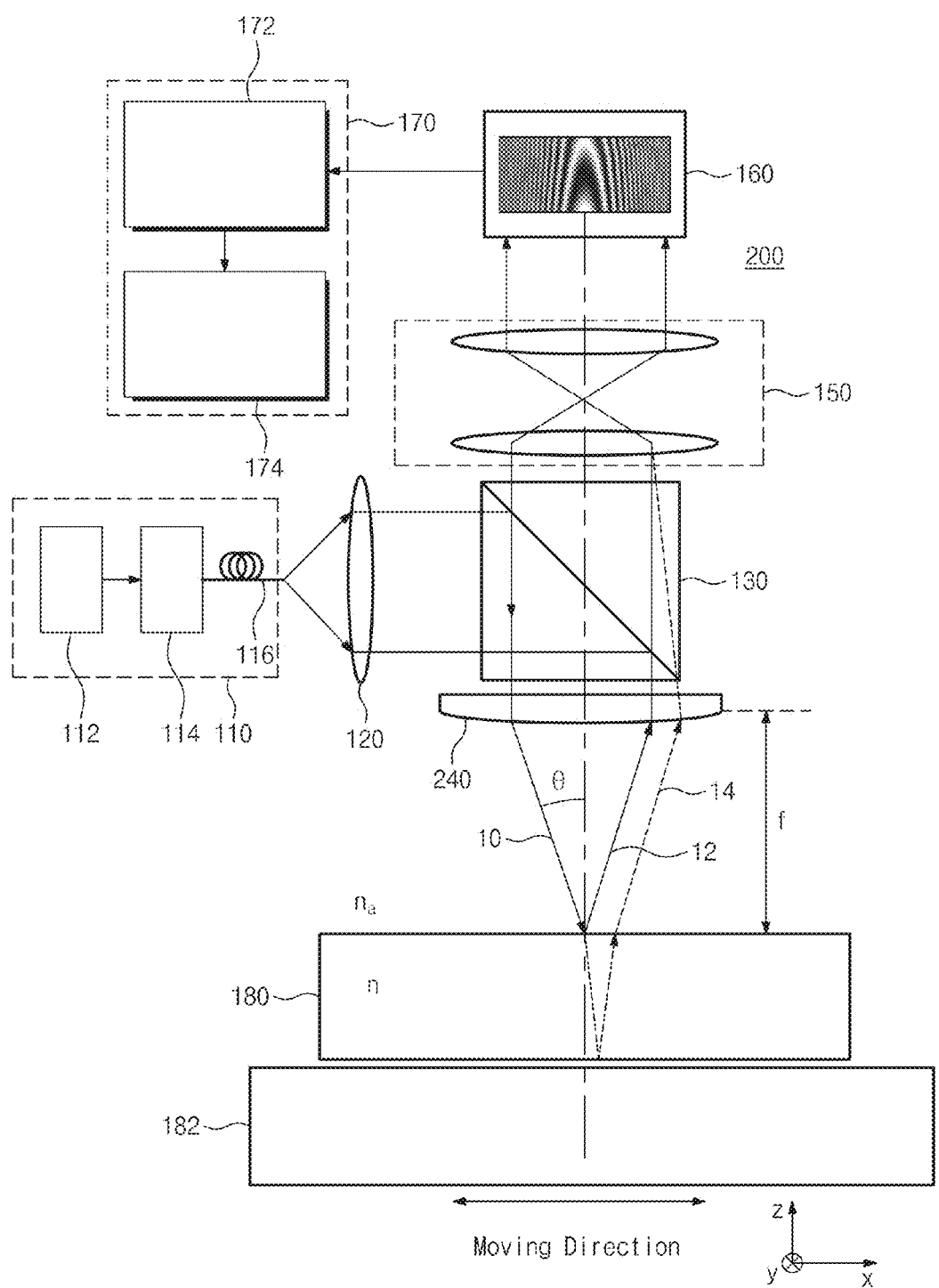
FIG. 11 illustrates a thickness measuring apparatus according to example embodiments of the present disclosure.

FIG. 11 illustrates a thickness measuring apparatus according to example embodiments of the present disclosure. In FIG. 11, the same components or parts as those shown in FIGS. 1 to 6 are designated with the same numerals and their explanations will be omitted.

Figure 12:
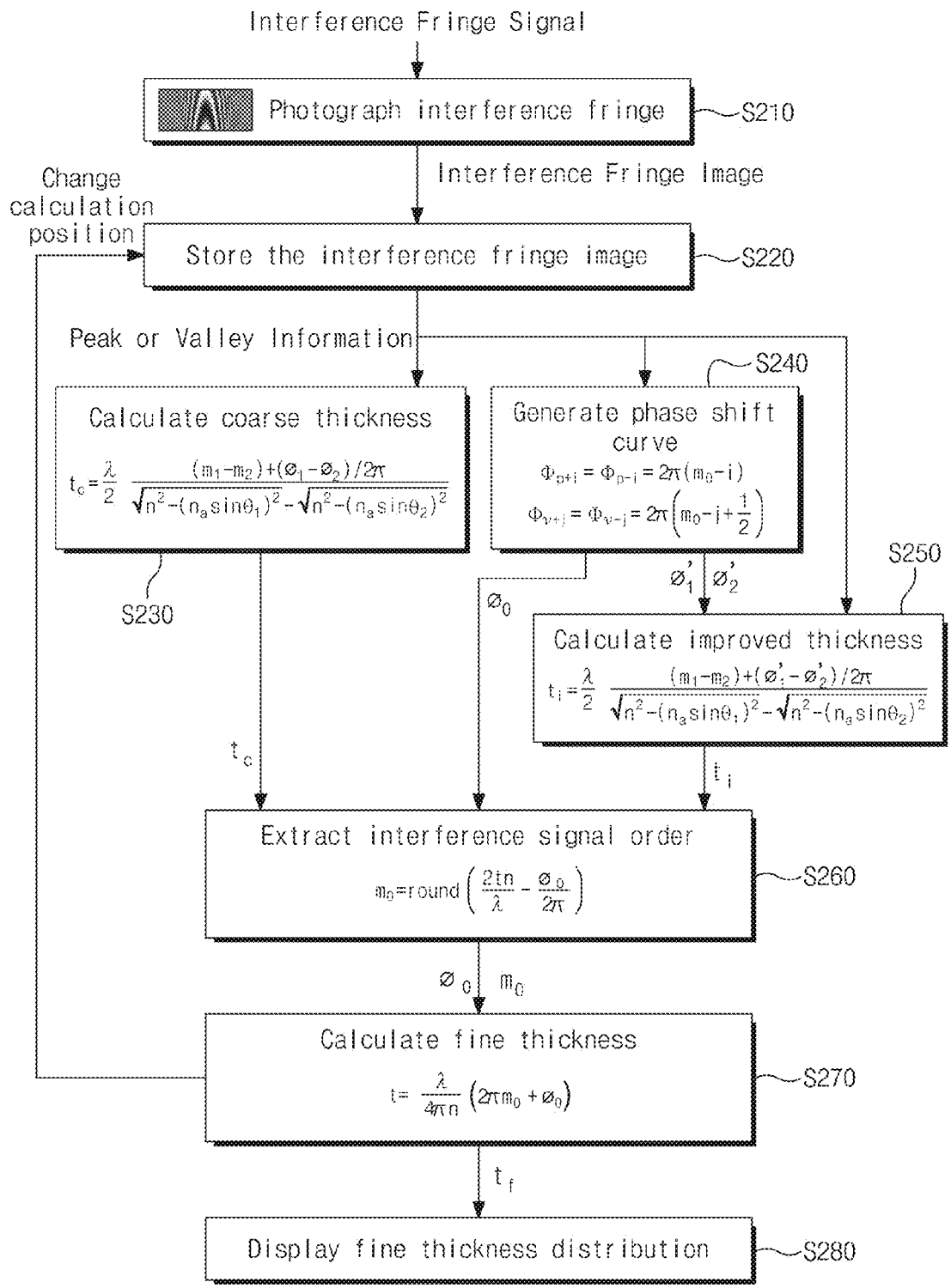
FIG. 12 is a flowchart summarizing a thickness measuring method using the thickness measuring apparatus in FIG. 11.

FIG. 12 is a flowchart summarizing a thickness measuring method using the thickness measuring apparatus in FIG. 11.

Referring to FIGS. 11 and 12, a thickness measuring apparatus 200 includes a light source 110 outputting extended monochromatic light having coherence, a collimating lens 120 converting the output light of the light source 110 into incident beam 10 of parallel light, a beam splitter 130 reflecting and providing the incident beam 10 to a measurement target 180 and transmitting first reflection light 12 and second reflection light 14 respectively reflected on a top surface and a bottom surface of the measurement target 180, an imaging lens 240 disposed between the measurement target 180 and the beam splitter 130 with a predetermined focal distance to receive and provide the incident beam 10 to a measurement position of the measurement target 180 disposed on the focal distance, a camera 160 photographing an interference fringe formed by the first and second reflection lights 12 and 14 transmitting the imaging lens 240 to output an interference fringe image, and a processing part 170. The processing part 170 generates a curve-fitted phase shift curve using phases and incidence angles respectively corresponding to a plurality of valleys and a plurality of peaks and calculates thickness of the measurement target 180 using the phase shift curve.

The imaging lens 240 may be a cylindrical lens. The cylindrical lens may be a lens cut along a chord of a circle in a direction of the central axis of a cylinder. The cylindrical lens may include a curved surface having a fixed curvature and a plane disposed opposite to the curved surface.

The imaging lens 240 may extend with a fixed focal distance f in an extending direction (y-axis direction). Accordingly, a measurement position may be not a point but a line of the y-axis direction disposed on the focal distance of the imaging lens 240. Since an interference fringe is formed depending on the measurement position of y-axis direction, thickness may be calculated in the y-axis direction even when a moving stage 182 is not scanned.

Referring to FIGS. 12 and 5, a thickness measuring method includes providing extend monochromatic light with coherence in the form of parallel light (S110), receiving the parallel light through an imaging lens and irradiating the received parallel light to a measure position of a measurement target disposed on a focus of the imaging lens (S120), forming an interference fringe using first reflection light and second reflection light respectively reflected on a top surface and a bottom surface of the measurement target disposed on the focus of the imaging lens (S130), photographing the interference fringe to form an interference fringe image (S140), generating a curve-fitted phase shift curve using phases and incidence angles respectively corresponding to a plurality of peaks and a plurality of valleys in the interference fringe image (S150), and calculating thickness of the measurement target using the phase shift curve (S160).

The camera 160 may photograph the interference fringe to output the interference fringe image (S210). An image grabber 172 may store the interference fringe image (S220). A coarse thickness calculator 174*a* may receive the stored interference fringe image to calculate coarse thickness information between the top surface and the bottom surface of the measurement target using information of two points among the peaks and valleys in the interference fringe image (S230).

A phase shift curve generator 174*b* may generate a curve-fitted phase shift curve using phases and incidence angles respectively corresponding to a plurality of peaks and a plurality of valleys in the interference fringe image and extract a center phase corresponding to a center point of the interference fringe using the curve-fitted phase shift curve (S250).

An improved thickness calculator 174*c* may calculate improved thickness using a correction phase calculated using the curve-fitted phase shift curve (S250).

An interference signal order extractor 174*d* may extract an interference signal order of the center point of the interference fringe image using the coarse thickness information or the coarse thickness information and the center phase information (S260).

A fine thickness calculator 174*e* may calculate fine thickness information between the top surface and the bottom surface of the measurement target using the interference signal order of the center point of the interference fringe image and the center phase corresponding to the center point of the interference fringe (S270).

A fine thickness distribution display part 174*f* may display the calculated fine thickness (S280).

If the imaging lens 240 is a cylindrical lens, a measurement position is a line. Therefore, thickness may be calculated at each measurement point. That is, a corresponding interference signal profile may be used to calculate thickness at each measurement point.

According to example embodiments of the present disclosure, a thickness profile measuring method of a transparent flat plate using a Haidinger interference fringe is proposed. The proposed measuring method may overcome limitation of 2 π ambiguity that an interferometer has and obtain thickness measurement resolution and repeatability similar to those of a typical thickness measurement interferometer.

In a Haidinger interference fringe generated when a collected extended monochromatic light source impinges on a transparent flat plate, a phase shift curve may be calculated by curve-fitting peak and valley positions of the interference fringe whose phase value is 0 or π. Since a plurality of peaks points and a plurality of valley points are used, higher repeatability and higher accuracy may be obtained than those when a phase shift curve is calculated using a phase difference at two points.

As described above, a thickness measuring apparatus according to example embodiments of the present disclosure may directly measure thickness of a desired point without depending on a result measured at another point.

Moreover, a thickness measuring apparatus according to example embodiments of the present disclosure may directly measure thickness of a desired point even when a step difference is formed on a transparent substrate due to coating or the like.

Although the present disclosure and its advantages have been described in detail, it should be understood that various changes, substitutions and alterations can be made herein without departing from the spirit and scope of the disclosure as defined by the following claims.

What is claimed is:

1. A thickness measuring apparatus comprising:
   a light source for outputting an extended monochromatic light with coherence;
   a collimating lens for converting output light of the light source into an incident beam of parallel ray;
   a beam splitter for reflecting and providing the incident beam to a measurement target and transmitting first reflection light reflected on a top surface of the measurement target and second reflection light reflected on a bottom surface of the measurement target;
   an imaging lens disposed between the measurement target and the beam splitter with a predetermined focal distance to receive and provide the incident beam to a measurement position of the measurement target disposed on the focal distance;
   a camera for photographing an interference fringe formed by the first and second reflection lights and for outputting an interference fringe image; and
   a processing part for generating a curve-fitted phase shift curve using phases and incidence angles, respectively corresponding to a plurality of valleys and a plurality of peaks, and for calculating thickness of the measurement target using the phase shift curve, the processing part comprising:
   an image grabber for storing the interference fringe image;
   a coarse thickness calculator for receiving the interference fringe image stored by the image grabber to calculate coarse thickness information between the top surface and the bottom surface of the measurement target using information of two points among peaks and valleys in the interference fringe image;
   a phase shift curve generator for generating a curve-fitted phase shift curve using phases and incidence angles, respectively corresponding to a plurality of peaks and a plurality of valleys in the interference fringe image, and for extracting a center phase corresponding to a center point of the interference fringe using the curve-fitted phase shift curve;
an interference signal order extractor for extracting an interference signal order of the center point of the interference fringe image using the coarse thickness information and the center phase; and
a fine thickness calculator for calculating a fine thickness between the top surface and the bottom surface of the measurement target using the interference signal order of the center point of the interference fringe image and the center phase corresponding to the center point of the interference fringe.

2. The thickness measuring apparatus of claim 1, wherein the light source comprises:
a laser diode configured to oscillate at a predetermined wavelength;
a speckle reducer for receiving output light of the laser diode to suppress a speckle; and
a multi-mode optical fiber for transferring light passing through the speckle reducer.

3. The thickness measuring apparatus of claim 1, further comprising a relay optical part disposed between the beam splitter and the camera to adjust a magnification of the interference fringe.

4. The thickness measuring apparatus of claim 1, further comprising a moving stage for moving the measurement target.

5. The thickness measuring apparatus of claim 1, wherein the imaging lens is a cylindrical lens.

6. A thickness measuring method comprising:
providing extended monochromatic light with coherence in a form of parallel light;
receiving the parallel light using an imaging lens and illuminating the received parallel light to a measurement position of a measurement target disposed in a focal point of the imaging lens according to an incidence angle;
forming an interference fringe using first reflection light and second reflection light respectively reflected on a top surface and a bottom surface of the measurement target disposed in the focal point of the imaging lens;
photographing the interference fringe to form an interference fringe image;
forming a curve-fitted phase shift curve using phases and incidence angles, respectively corresponding to a plurality of peaks and a plurality of valleys in the interference fringe image; and
calculating a thickness of the measurement target using the phase shift curve, comprising steps of:
calculating coarse thickness information between the top surface and the bottom surface of the measurement target using information of two points among the peaks and the valleys in the interference fringe image;
extracting a center phase corresponding to a center point of the interference fringe using the curve-fitted phase shift curve;
extracting an interference signal order of the center point of the interference fringe image using the coarse thickness information and the center phase; and
calculating fine thickness between the top surface and the bottom surface of the measurement target using the interference signal order of the center point of the interference fringe image and the center phase corresponding to the center point of the interference fringe.

7. The thickness measuring method of claim 6, wherein calculating the thickness of the measurement target using the phase shift curve comprises:
extracting a correction phase corresponding to a specific position of the interference fringe using the curve-fitted phase shift curve; and
calculating improved thickness information between the top surface and the bottom surface of the measurement target using the information of the two points among the peaks and the valleys in the interference fringe image.

8. The thickness measuring method of claim 6, further comprising providing the parallel light to the imaging lens through a beam splitter.

9. The thickness measuring method of claim 8, wherein forming the interference fringe using the imaging lens further comprises:
transferring the first reflection light and the second reflection light passing through the imaging lens and the beam splitter to a relay optical part having a predetermined magnification.

10. The thickness measuring method of claim 6, wherein the imaging lens is a cylindrical lens, and a thickness of the measurement target is calculated at each position depending on an extending direction of the cylindrical lens.

11. A thickness measuring apparatus comprising:
an interferometer for forming an interference fringe concerning a measurement point of a measurement target using extended monochromatic light having coherence;
a camera for photographing the interference fringe to output an interference fringe image; and
a processing part for generating a curve-fitted phase shift curve using phases and incidence angles, respectively corresponding to a plurality of peaks and a plurality of valleys in the interference fringe image, and for calculating a thickness of the measurement target using the phase shift curve,
wherein the processing part comprises:
an image grabber for storing the interference fringe image;
a coarse thickness calculator for receiving the stored interference fringe image to calculate coarse thickness information between a top surface and a bottom surface of the measurement target using information of two points among peaks and valleys in the interference fringe image;
a phase shift curve generator for generating a curve-fitted phase shift curve using phases and incidence angles, respectively corresponding to a plurality of peaks and a plurality of valleys in the interference fringe image, and for extracting a center phase corresponding to a center point of the interference fringe using the curve-fitted phase shift curve;
an interference signal order extractor for extracting an interference signal order of the center point of the interference fringe image using the coarse thickness information or improved thickness and the center phase; and
a fine thickness calculator for calculating fine thickness between the top surface and the bottom surface of the measurement target using the interference signal order of the center point of the interference fringe image and the center phase corresponding to the center point of the interference fringe.

12. A thickness measuring method comprising:

forming an interference fringe concerning a measurement point of a measurement target using extended monochromatic light having coherence;

photographing the interference fringe to form an interference fringe image;

generating a curve-fitted phase shift curve using phases and incidence angles, respectively corresponding to a plurality of peaks and a plurality of valleys in the interference fringe image;

calculating coarse thickness between a top surface and a bottom surface of the measurement target using information of two points among peaks and valleys in the interference fringe image;

extracting a center phase corresponding to a center point of the interference fringe using the curve-fitted phase change curve;

extracting an interference signal order of the center point of the interference fringe image using the coarse thickness and the center phase; and calculating coarse thickness between the top surface and the bottom surface of the measurement target using the interference signal order of the center point of the interference fringe image and the center phase corresponding to the center point of the interference fringe.

* * * * *